United States Patent [19]

Kronogård

[11] 4,118,927
[45] Oct. 10, 1978

[54] GAS TURBINE POWER PLANT

[75] Inventor: Sven-Olof Kronogård, Lomma, Sweden

[73] Assignee: United Turbine AB & Co. Kommanditbolag, Malmo, Sweden

[21] Appl. No.: 744,928

[22] Filed: Nov. 24, 1976

[30] Foreign Application Priority Data

Dec. 5, 1975 [SE] Sweden ............................... 75137158

[51] Int. Cl.² .............................. F02C 3/10; F02C 7/02
[52] U.S. Cl. ............................ 60/39.16 R; 60/39.16 S
[58] Field of Search ................... 60/39.16 R, 39.16 S; 415/110, 111, 112

[56] References Cited

U.S. PATENT DOCUMENTS

| | | | |
|---|---|---|---|
| 2,625,790 | 1/1953 | Petrie | 60/39.16 R |
| 3,035,759 | 5/1962 | Paulson et al. | 415/111 |
| 3,196,611 | 7/1965 | Henny | 60/39.16 R |
| 3,498,057 | 3/1970 | Kronogard et al. | 60/39.16 SI |
| 4,064,690 | 12/1977 | Kronogard | 60/39.16 R |

*Primary Examiner*—Louis J. Casaregola
*Attorney, Agent, or Firm*—Cantor & Singer

[57] ABSTRACT

An automotive power plant includes three turbine rotors, of which one forms a spool together with the compressor, and the other two rotors are interconnected by a gearing. The first turbine rotor is undersized, and cannot provide the necessary power for driving the compressor at full load, although the spool does not have to drive any internal auxiliaries. A slim shaft, carried in air bearings and rotating at supercritical speed, also when the plant is idling, transfers power from the gearing to the compressor spool.

The turbine casing is die-cast of a light metal alloy, and is internally clad with pre-formed ceramic insulation components, bonded to the metal walls. In a front drive vehicle the casing is mounted in arcuate guides having their centers at the vehicle wheel axles, whereby the casing may be swung about 90°, when the gas turbine is to be serviced.

5 Claims, 5 Drawing Figures

GAS TURBINE POWER PLANT

BACKGROUND OF THE INVENTION

A common consideration when designing gas turbine power plants, especially for automotive purposes, is to maintain a high efficiency while simultaneously reducing weight and space requirements, and further to make the various components of the plant easily available for survey and maintenance. A further aim is to design the plant in such a manner that the gas producing part can be easily accelerated which is of high importance, especially with automotive plants.

In order to obtain satisfactory operational results the plant should include three turbine rotors connected to their own shafts, a first turbine rotor being drivingly connected to the compressor of the plant, to form a rotor spool. This first turbine rotor is so designed that it, at full load upon the plant, will not provide sufficient power for the compressor work, so additional power will have to be transferred from either of the two other turbine rotors. The second rotor, as counted in the direction of flow of the gases, is the power turbine proper, while the third turbine rotor has diverse auxiliary functions and in a manner known per se is interconnected to the second turbine rotor, the last mentioned rotors operating upon concentric shafts.

SUMMARY OF THE INVENTION

A possibility of obtaining a rapid acceleration of the gas producing portion is to design this portion according to the invention so the compressor/turbine spool is not subjected to any load from the internal auxiliaries of the plant. The two concentric shafts pertaining to the second and the third turbine rotors are interconnected by a gearing, located at the end of said shafts remote from the compressor/turbine spool, the transfer of power to the latter occurring by way of a shaft, extending centrally through the concentric shafts.

The central power transfer shaft is preferably arranged so it will rotate at a supercritical speed, also when the plant is idling, and it is advantageously carried in air bearings at the innermost of the concentric shafts.

The second turbine rotor is preferably journalled in a tubular member, projecting from the third turbine rotor, said third rotor being journalled in the turbine casing. The bearing carrying the second turbine rotor at the tubular member is preferably an air bearing.

By locating the power turbine between the compressor/turbine spool and the auxiliary turbine rotor all bearings supporting high speed shafts will obtain a carrying lubricating capacity also when the power turbine rotor is stalled when the vehicle is at a stand-still. This is impossible with conventional two-shaft turbines having a free power turbine. If the bearings are designed for air lubrication, no return flow conduits for lubricating oil will be required, and the air may be conducted away and be utilized for cooling purposes, for instance at the rotors.

With a conventional gas turbine power plant an acceleration usually is brought about by the supply of an excess of fuel, above what is necessary for full power. On each occasion the components will suffer from a temperature shock implying an increase of temperature by 100° to 150° C. These supertemperatures are the foremost reasons for the reduced working life of these already highly heat loaded components, which all are expensive to manufacture — in the first hand the turbine vanes, but also the turbine rotors, the combustor and the inlet volute.

By designing the compressor/turbine spool so it can easily be supplied with additional power, and furthermore so it can be rapidly accelerated without being burdened with auxiliaries, it is possible to avoid these super-temperatures. This means that it is possible to utilize the material in an advantageous manner and to provide a lightweight and cheap turbine design. The super-temperatures are one of the more important factors causing generation of nitrogen oxides (NOx), so also for that reason an avoiding of super-temperatures is an advantage. An arrangement including a rapidly accelerating compressor furthermore means that the idling speed may be kept low, which means a reduced overall fuel consumption and thus reduced emissions. Also with an extremely low idling speed it is possible to transfer impulse energy from the other turbine rotors to the compressor by way of the central power transfer shaft.

The compressor turbine, which first encounters the hot gases, is preferably manufactured of ceramic material, and will thus have a low weight. As this turbine rotor will not have to provide the full power for the compression work it may be designed with a small diameter. The second turbine rotor may, on occasions, also be made of ceramic material, while the third rotor, which has a comparatively big diameter, preferably is manufactured of metallic material and thus will possess a high inertia. As mentioned above the third rotor will continue to run, even if the second rotor should stall when the vehicle is at stand-still. There will, thus, always be impulse energy at hand.

By designing the rotors so they rotate in opposite directions it is possible to obtain a certain balancing of the gyratory forces, and also to utilize the vane system in an advantageous manner.

If the plant is provided with a heat exchanger a two stage regenerative system is obtained, where in the first hand the third turbine rotor will utilize the effluent energy from the second turbine rotor and furthermore exchange losses in the aerodynamic moment transfer within the turbine system with a high efficiency (up to 90 – 95%) is recovered in the heat exchanger.

If the distribution of power between the shafts of the second and the third turbine rotor includes a planetary gear and the power transfer from the latter to the compressor/turbine spool is governed by a variable transmission it is possible, during an acceleration, to obtain a moment of reaction caused by the impulse power transfer at the power output shaft.

In order to attain a low weight and a cheap production the turbine casing advantageously is die-cast in some lightmetal alloy. Internal surfaces guiding the flow of gases and air are then covered with preformed elements of some ceramic material which are bonded to the lightmetal walls. These ceramic elements may be formed so they wholly or partly form the inlet volute to the turbine.

With automotive plants including a heat exchanger great care must be taken with respect to the mounting of the power unit so a simple servicing and a substitution of components is made possible. The invention will also provide an advantageous manner of mounting the turbine in a vehicle, whereby an increased space — as compared to conventional arrangements — is obtained, which may be used for safety — or shockabsorbing devices, or for carrying of luggage. A dimensioning with respect to the requirements of the gas turbine will mean a reduction of the length and the weight of the vehicle.

Further advantages will be evident from the following description.

DESCRIPTION OF SOME PREFERRED EMBODIMENTS

Figure 1:
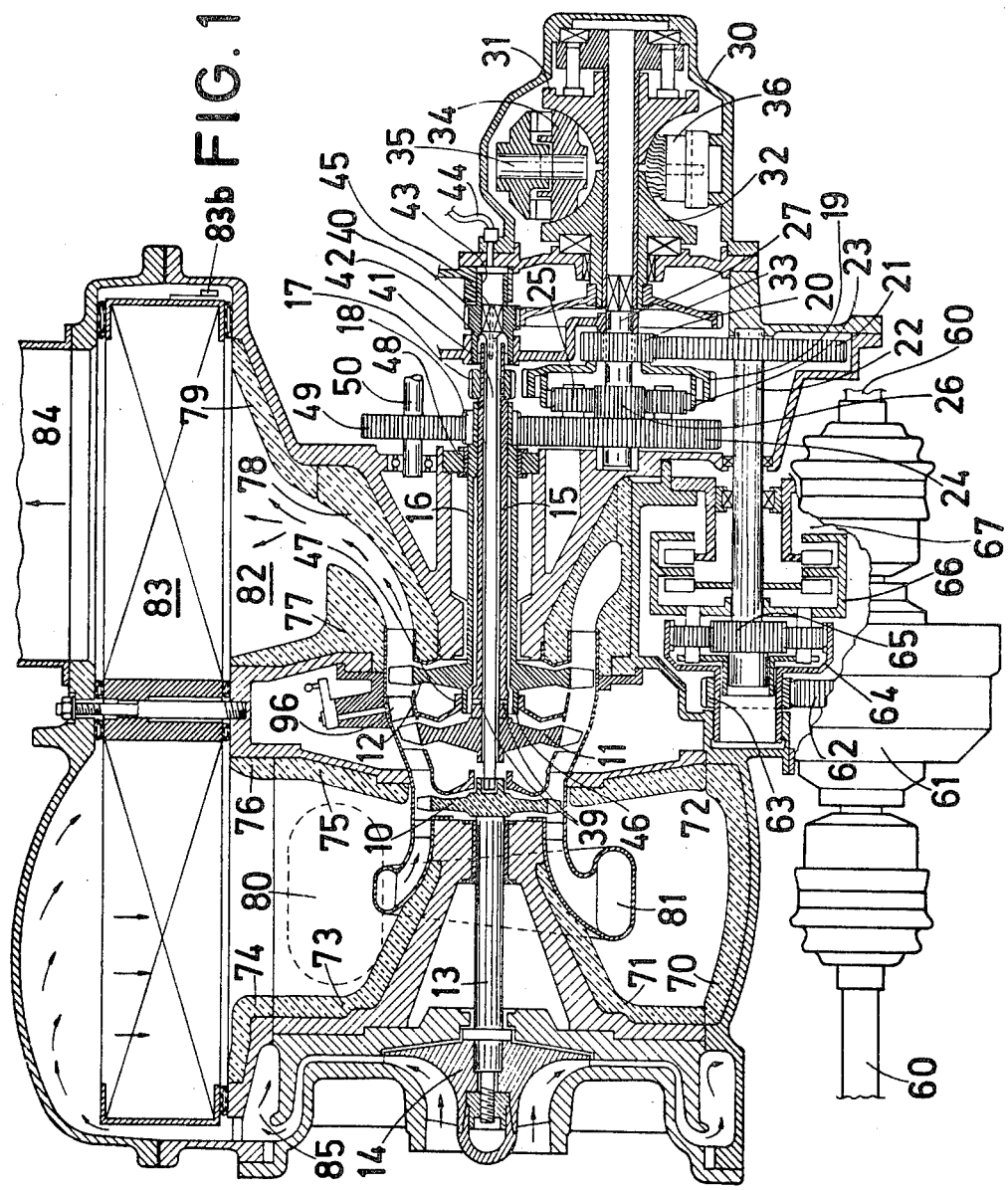
FIG. 1 is a longitudinal section through an automotive gas turbine power plant and the means for transferring of power to the vehicle wheels, FIG. 2 schematically shows the mounting of the gas turbine within the vehicle, and FIGS. 3 - 5 on a reduced scale show the turbine plant, as viewed in in different directions.

The gas turbine shown in FIG. 1 comprises three turbine rotors 10, 11, 12 arranged axially downstream of each other, to be supplied with motive gases from a combustor, not shown in the drawing.

The first turbine rotor 10 is connected to the compressor 14 of the plant by means of a shaft 13, and forms, together with the compressor, a spool unit. Turbine rotor 10 is preferably manufactured of a ceramic material, in order to obtain the best capacity for withstanding the high temperature of the in-coming gases. In order to reduce the mass of the rotor this stage is dimensioned so rotor 10 does not provide the full power for compression work during full load of the plant. A further important feature is that this spool unit does not have to drive any auxiliaries. This means that it is easy to accelerate the compressor/turbine spool.

The second turbine rotor 11, which is the main power turbine, is mounted upon a first tubular shaft 15, while the third turbine rotor 12 is mounted upon a second tubular shaft 16, which concentrically encloses the first hollow shaft.

Shaft 15 is provided with a pinion 17, and shaft 16 with a pinion 18. These pinions co-operate with a moment divider, formed as a planetary gearing.

Pinion 17 co-operates with an intermediate gear wheel — not shown in the drawing — and located beyond the shown plane thereof. This intermediate gear wheel meshes with a big, bowl-shaped gear wheel 19, the hub portion 20 of which is formed as a gear wheel and co-operates with a further gear wheel 21, mounted upon a power take-off shaft 22. The further flow of power from this shaft will be described below.

The bowl-shaped gear wheel 19 is provided with an internal gear ring 23, which serves as ring wheel in the planetary gearing mentioned above.

Pinion 18 at the shaft from third turbine rotor 12 co-operates with the planetary gear wheel carrier 24 of the planetary gearing. Planetary gear wheels 25 connect ring wheel 23 with a sun wheel 26, which is mounted upon a shaft 27 serving to transfer power to the compressor/turbine spool.

The amount of power to be transferred is determined by a variable transmission, generally denoted by 30.

The transmission shown includes a first rotor body 31 connected to shaft 27, and a second rotor body 32, which here is connected to a big gear wheel 33. Adjustable contact elements 34 are arranged between rotor bodies 31 and 32 for rotation with respect to trunnions 35, directed radially outwards from shaft 27. By altering the inclination of these trunnions, with respect to a plane normal to shaft 27, it is possible to alter the speed relationship between the two rotor bodies 31 and 32.

In the position shown, where the trunnions 35 are directed perpendicularly with respect to shaft 27, the rotor bodies will run with the same speed. A lubricant distributor 36 is fitted between two adjacent contact elements 34 and is arranged to provide lubricant to the various contact surfaces.

This type of variable transmission is well known in the art, but other devices having a similar function may of course be used instead.

The big gear wheel 33 co-operates with a pinion 40, which is mounted at one end of a slim shaft 41, located centrally within the innermost tubular shaft 15. The end of shaft 41 remote from pinion 40, non-rotatably, but slidably in the axial direction engages rotor 10 of the compressor spool.

Pinion 40 is provided with a pair of tubular studs 42, 43, projecting from opposite sides of the pinion and being carried by surrounding portions of the turbine casing. An air conduit 44 from the compressor is connected to the turbine casing adjacent to these studs. Air will flow through tubular stud 43 by way of a bore 45 in the adjacent end of slim shaft 41 and out into the clearance between said shaft and the surrounding hollow shaft 15. The end of last mentioned shaft extending past pinion 17 is carried in tubular stud 42 belonging to pinion 40.

The third turbine rotor, 12, is provided with a tubular member 46 extending towards the second turbine rotor 11, and being journalled in the turbine casing by a bearing 47. The end of the innermost, tubular shaft, 15, is, in turn, journalled in this tubular member. The end of shaft 16, remote from the rotors is journalled in the turbine casing by a plain bearing 48. The journal carrying the innermost tubular shaft in tubular member 46 is an air bearing, which is provided with air through radial bores 39.

The slim transfer shaft 41 is dimensioned in such a manner that it will rotate at a supercritical speed. also when the plant operates at low idling speed. It can, within hollow shaft 15, be provided with at least one dampening bearing (not shown), but will, due to its design automatically enter a self-centered position, as soon as the plant has passed its starting period.

This slim shaft 41, thus, is essentially carried by air within tubular shaft 15 and is at its ends carried in bearings — in the tubular portions 42 and 46, respectively, which are lubricated by air supplied through conduit 44. As mentioned above, shafts 15 and 16 rotate in opposite directions, and the bearing between these shafts must be carefully designed.

Pinion 18 drives, beside the planetary gear wheel carrier 24, also a pinion 49 mounted upon a shaft 50. The auxiliary apparatus (not shown) — the fuel and the lubricant pumps, the electric generator, the power means for the heat exchanger and so forth — are driven from this shaft, and it is evident that this drive will not influence the power transfer to the compressor/turbine spool.

The power transfer from power take-off shaft 22 to the driving axles 60 at the vehicle wheels occurs in conventional manner by way of a differential 61. This is provided with an external gear ring 62, which meshes with a pinion 63 integral with the hub of a ring wheel 64 forming part of a second planetary gearing. The sun wheel 65 thereof is fitted upon power take-off shaft 22, and its planetary gear wheel carrier 66 is included in a ahead/reverse gear 67 of arbitrary, known type.

In this embodiment, where the turbine shafts are parallel to the vehicle wheels axles 60, gear wheels 62 and 63 are cylindrical. When the turbine shafts are located transversely with respect to the wheel axles these gear wheels will have to be conical.

The casing enclosing the turbines and the compressor are die-cast of a light metal alloy. The internal faces of the casing, guiding the flow of air and gases are covered by an insulation of ceramic material. In this manner a light-weight, but strong construction having favourable thermal properties is obtained.

The ceramic insulation is built up of pre-formed components, denoted by 70 - 76 at the air inlet side, and 77 - 79 at the gas outlet side. The ceramic components are bonded to the light metal walls.

The gas issuing from the combustor (not shown) flows by way of a passage 80 to the turbine inlet volute 81, and flows, downstream of the turbine rotors, upwards into a chamber 82. The inlet and the outlet volute, respectively, are here designed as thin metal membranes, which are partly supported by the ceramic insulation, but it is evident that the insulation may itself be designed so it will define the walls of the air and/or gas passages — as shown in the downstream portion of the gas passage.

The plant includes an air preheater 83 of a conventional, rotatable regenerative type. The gases issuing from the downstream turbine rotor pass through chamber 82 upwards through one half of the rotor, to an exit 84. Air passes from compressor 14 by way of a plenum chamber 85 to the remote side of the air preheater rotor and passes the latter in a downwardly direction.

A heat exchanger of the type shown, i.e., a rotatable, regenerative one, is to be preferred with light vehicles and medium pressure ratios. At higher pressure ratios a recuperative heat exchanger is preferable.

Adjustable guide vanes 96 are provided between the second and the third turbine rotors, 11 and 12, respectively. By means of these guide vanes it is possible to direct the distribution of power between the two rotors, and, on occasions, to govern the power transfer to the compressor/turbine spool without the aid of any transmission 30, possibly having this substituted by a simple stepped gear.

Figure 2:
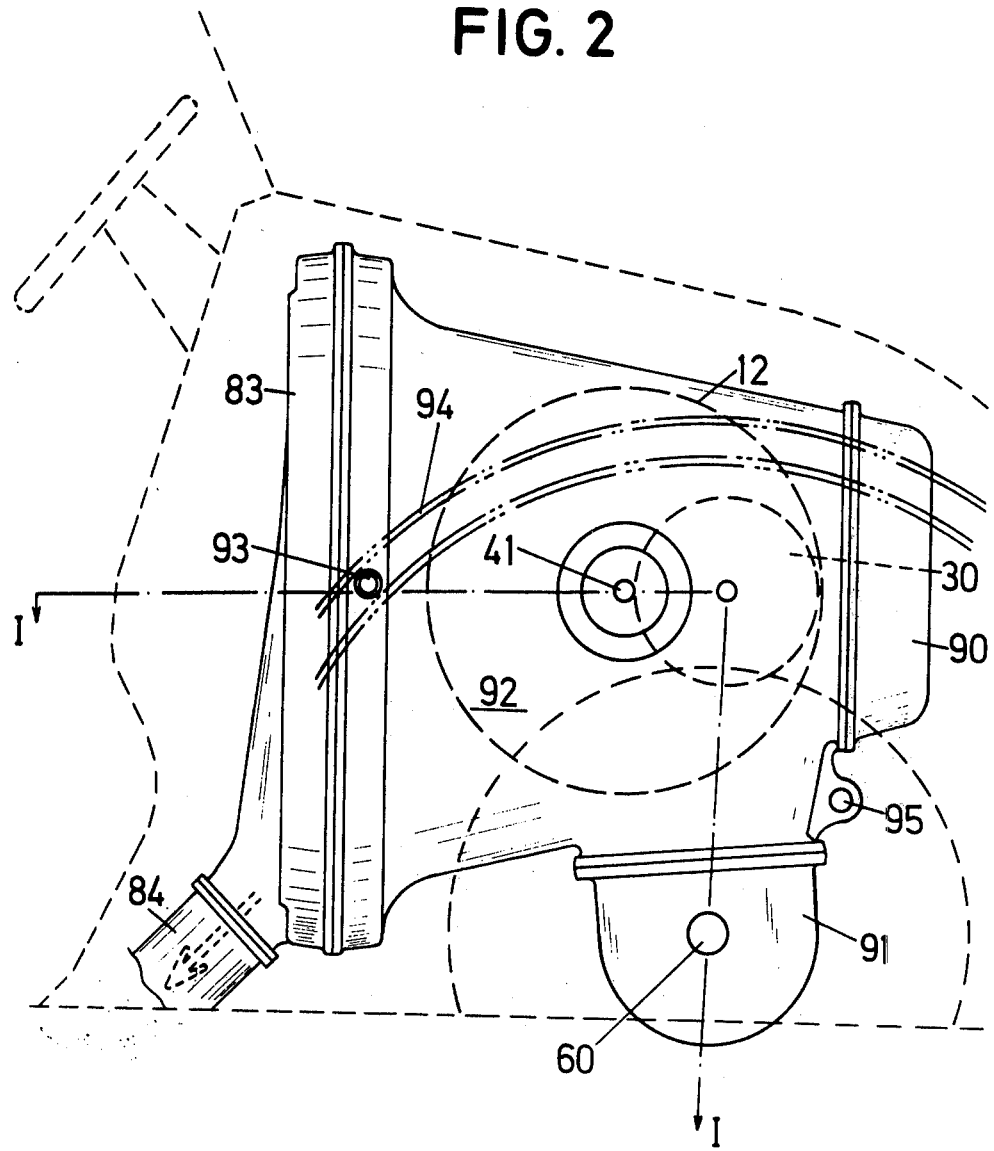

FIG. 2 schematically shows how the gas turbine unit is mounted in the motor casing of a vehicle designed for driving at the front wheels, and it should be noted, that FIG. 1 shows a section along line I - I thereof.

The combustor 90 of the plant is directed forwards and is thus always easily accessible. The housing 91 including the differential and the reverse gear is flanged to the casing 92 of the turbine. In this manner it is possible, during a major survey of the gas turbine, to remove the casing while permitting the differential to remain at the vehicle.

Heat exchanger 83 is located oppositely the combustor, i.e., adjacent to the driver's seat and the gas outlet 84 is directed downwardly/backwards, below the chassis. The rotational axis of the heat exchanger, and the centre line of the combustor are arranged about at the same level with a slight inclination in relation to the horizontal plane. When the cover of the heat exchanger has been removed it will be possible to take out the rotor obliquely upwards/outwards, without interfering with the turbine casing.

The turbine casing is supported by the vehicle at three, possibly at four points. Two of these points are designed as rollers 93 located in aligned positions at opposite sides of the turbine casing. These rollers run in fixed, arcuate guides 94 having their centres at the driving axles 60 of the vehicle wheels. One, or possibly two, attachments 95 are provided at the forward end of the casing. When these attachments have been disengaged the turbine casing may be swung about the wheel axles, so the heat exchanger will be directed more or less straight upwards.

For orientation the position of the slim power transfer shaft is shown in FIG. 2, as well as the perimeter of the biggest turbine rotor 12. The position of the variable transmission 30 is also indicated.

It is evident that there may be means for securing, in use, the position of rollers 93 in relation to guides 94, and that further guides or sliding members may be provided for turning the turbine casing.

Figure 3:
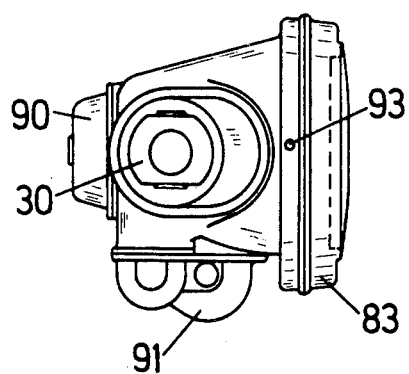
Figure 4:
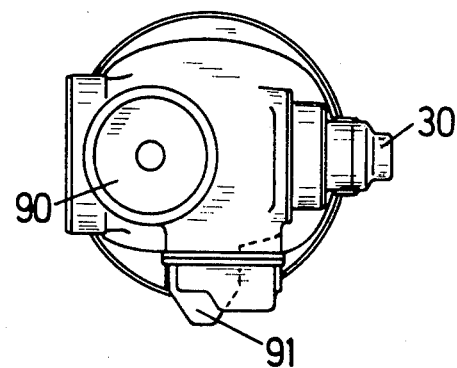
Figure 5:
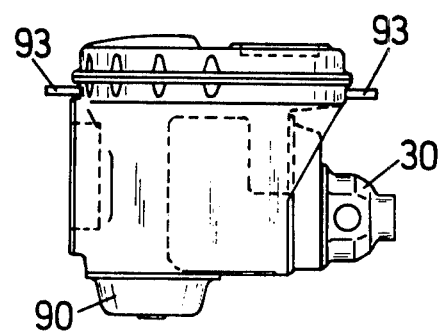

FIGS. 3 - 5 show, on a reduced scale, the gas turbine plant as viewed in a direction opposite to that of FIG. 2, and from its forward end and its rearward end, respectively.

What I claim is:

1. A gas turbine power plant having conventional internal auxiliaries and including three axially aligned turbine rotors arranged in series downstream of a combustor, said gas turbine power plant comprising:
   (A) a compressor delivering air to said combustor and being drivingly connected to a first rotor of said series to form a rotor-spool, said first mentioned turbine rotor being dimensioned with insufficient capacity to drive said compressor at full load of the plant;
   (B) means mounting said two other turbine rotors upon concentric shafts and gearing means located at the end of the concentric shafts mounting said second and third turbine rotors remote from said compressor/first turbine rotor spool to drivingly interconnect said concentric shafts at an output shaft;
   (C) first means, including a third shaft extending centrally through the innermost of said concentric shafts, for transferring power from the output end of said gearing means to said spool, said first means being adapted to permit said third shaft to rotate at supercritical speed also when the power plant is idling; and
   (D) second means for transferring power from said gearing means to said internal auxiliaries at the input from one of said other two rotors to said gearing means.

2. A gas turbine power plant including first, second and third axially aligned turbine rotors mounted in a common casing, and comprising:
   (A) a first of said rotors being drivingly connected to a compressor of the plant to form a rotor spool, said first turbine rotor being dimensioned with insufficient capacity to drive said compressor at full plant load;
   (B) means for mounting said second and third turbine rotors upon concentric hollow shafts;
   (C) gearing means located at the end of the concentric shafts mounting said second and third turbine rotors remote from said compressor/first turbine rotor spool to drivingly interconnect said concentric shafts;

(D) means, including a third shaft extending centrally through the innermost of said concentric shafts, for transferring power from said gearing means to said spool;

(E) first bearing means for mounting the shaft carrying said third rotor in said common casing;

(F) a tubular member extending from said third rotor towards said second rotor, and second bearing means for carrying said tubular member in said common casing; and (G) further bearing means for carrying said second turbine rotor in said tubular member.

3. The gas turbine according to claim 2, further including means at said gearing means for supplying air under pressure to the interior of the innermost of said concentric, hollow shafts for carrying said third shaft therein, and radial passages at the end of said innermost, hollow shaft adjacent to said second turbine rotor for transferring air to said further bearing means within said tubular member.

4. The gas turbine power plant of claim 1 including and a compressor driven by one of said turbine rotors, said compressor and said turbine rotors being mounted in a common casing, said gas turbine power plant comprising:

(A) a combustor receiving air from said compressor and delivering combustion gases to said turbine rotors;

(B) air preheater means between said combustor and said turbine rotors;

(C) first passage means for transferring gases exhausted from said third turbine rotor to said air preheater means;

(D) second passage means for transferring heated air from said air preheater means to said combustor;

(E) said common casing being manufactured of die-cast light metal alloy; and (F) pre-formed components of ceramic material bonded to the internal metal walls of said casing for guiding the flow of exhaust gases and heated air, respectively, through said first and second passage means.

5. The gas turbine power plant according to claim 1, in which the gearing means interconnecting the concentric turbine shafts is a planetary gearing, having a sun wheel, a number of planetary gear wheels mounted in a carrier, as well as a ring wheel, said second turbine rotor driving the ring wheel of said planetary gearing, said ring wheel, in turn, driving an external power take-off shaft, while said third turbine rotor is drivingly connected to said planetary gear wheel carrier, and parallel thereto to a power take-off to the auxiliaries of the plant, the power transfer to the compressor/turbine spool occurring by way of the sun wheel of the gear.

* * * * *